(12) United States Patent
Hahn

(10) Patent No.: US 8,753,047 B2
(45) Date of Patent: *Jun. 17, 2014

(54) DUST EXTRACTOR

(75) Inventor: Norbert Hahn, Hunstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/966,057

(22) Filed: Dec. 13, 2010

(65) Prior Publication Data

US 2011/0142561 A1 Jun. 16, 2011

(30) Foreign Application Priority Data

Dec. 15, 2009 (GB) .................................. 0921861.1

(51) Int. Cl.
*B23B 47/28* (2006.01)
*B23B 47/34* (2006.01)

(52) U.S. Cl.
USPC .............................. 408/67; 408/76; 408/115 R

(58) Field of Classification Search
USPC ............. 408/67, 76, 115 R; 409/137; 83/100; 173/198, 199
See application file for complete search history.

(56) References Cited

U.S. PATENT DOCUMENTS

| | | | | |
|---|---|---|---|---|
| 3,033,298 A | * | 5/1962 | Johnson | 175/209 |
| 4,205,728 A | * | 6/1980 | Gloor et al. | 175/209 |
| 4,345,805 A | * | 8/1982 | Finley et al. | 439/191 |
| 5,845,946 A | * | 12/1998 | Thomas | 285/348 |
| 6,036,237 A | * | 3/2000 | Sweeney | 285/322 |
| 6,695,353 B1 | * | 2/2004 | Treichel | 285/23 |
| 7,055,868 B2 | * | 6/2006 | Watanabe | 285/249 |
| 8,414,230 B2 | * | 4/2013 | Hahn | 408/67 |
| 2004/0247407 A1 | * | 12/2004 | Tillemans et al. | 409/137 |
| 2009/0172911 A1 | * | 7/2009 | Miyanaga | 15/339 |
| 2009/0317200 A1 | * | 12/2009 | Bruntner | 408/67 |

FOREIGN PATENT DOCUMENTS

| | | | |
|---|---|---|---|
| DE | 3501753 A1 | * | 7/1986 |
| EP | 681889 A1 | * | 11/1995 |
| EP | 1604777 | | 12/2005 |
| EP | 11894653 | | 3/2008 |
| GB | 2005403 | | 4/1979 |
| GB | 2189593 | | 10/1987 |
| GB | 2311598 | | 10/1997 |
| JP | 2010158766 A | * | 7/2010 |

* cited by examiner

*Primary Examiner* — Eric A Gates
*Assistant Examiner* — Paul M Janeski
(74) *Attorney, Agent, or Firm* — Kofi Schulterbrandt; Scott B. Markow; Adan Ayala

(57) ABSTRACT

A suction cup dust extractor for a drill having a housing; a drill collar attached to the housing, having a drill passage formed through it; an aperture located on the housing through which air can be sucked out by a suction device; a recess formed by the walls of the housing having an opening which, in use, locates against a work piece to create a chamber; at least one first air passage formed within the housing which enables air to pass from the drill passage to the aperture; at least one second air passage formed within the housing which enables air to pass from the recess to the aperture; and a manually operable valve mechanism mounted in the housing which is connected to the recess and which, when operated, allows air surrounding the housing to freely enter the recess when its opening is located against a work piece; characterized in that the housing further comprises a hand grip), the valve mechanism being mounted, at least in part, inside of the hand grip.

14 Claims, 14 Drawing Sheets

DUST EXTRACTOR

CROSS-REFERENCE TO RELATED APPLICATIONS

This application claims priority, under 35 U.S.C. §119(a)-(d), to UK Patent Application No. GB 09 218 61.1 filed Dec. 15, 2009, the contents thereof to be incorporated herein by reference in its entirety.

FIELD OF THE INVENTION

The present invention relates to a dust extractor for use with a drill, hammer drill or hammer, and in particular to a suction cup dust extractor.

BACKGROUND OF THE INVENTION

U.S. Pat. No. 4,205,728 and DE202008008561 both disclose a suction cup dust extractor for a drill. The present invention aims to provide an improvement in the design over those disclosed in U.S. Pat. No. 4,205,728 and DE202008008561.

BRIEF SUMMARY OF THE INVENTION

Accordingly, there is provided a suction cup dust extractor for a drill comprising:

a housing;

a drill collar attached to the housing, having a drill passage formed through it;

an aperture located on the housing through which air can be sucked out by a suction device;

a recess formed by the walls of the housing having an opening which, in use, locates against a work piece to create a chamber;

at least one first air passage formed within the housing which enables air to pass from the drill passage to the aperture;

at least one second air passage formed within the housing which enables air to pass from the recess to the aperture; and a manually operable valve mechanism mounted in the housing which is connected to the recess and which, when operated, allows air surrounding the housing to freely enter the recess when its opening is located against a work piece;

characterized in that the housing further comprises a hand grip, the valve mechanism being mounted, at least in part, inside of the hand grip.

BRIEF DESCRIPTION OF THE DRAWINGS

An embodiment of the invention will now be described with reference to enclosed drawings of which.

DETAILED DESCRIPTION OF THE INVENTION

Figure 1:
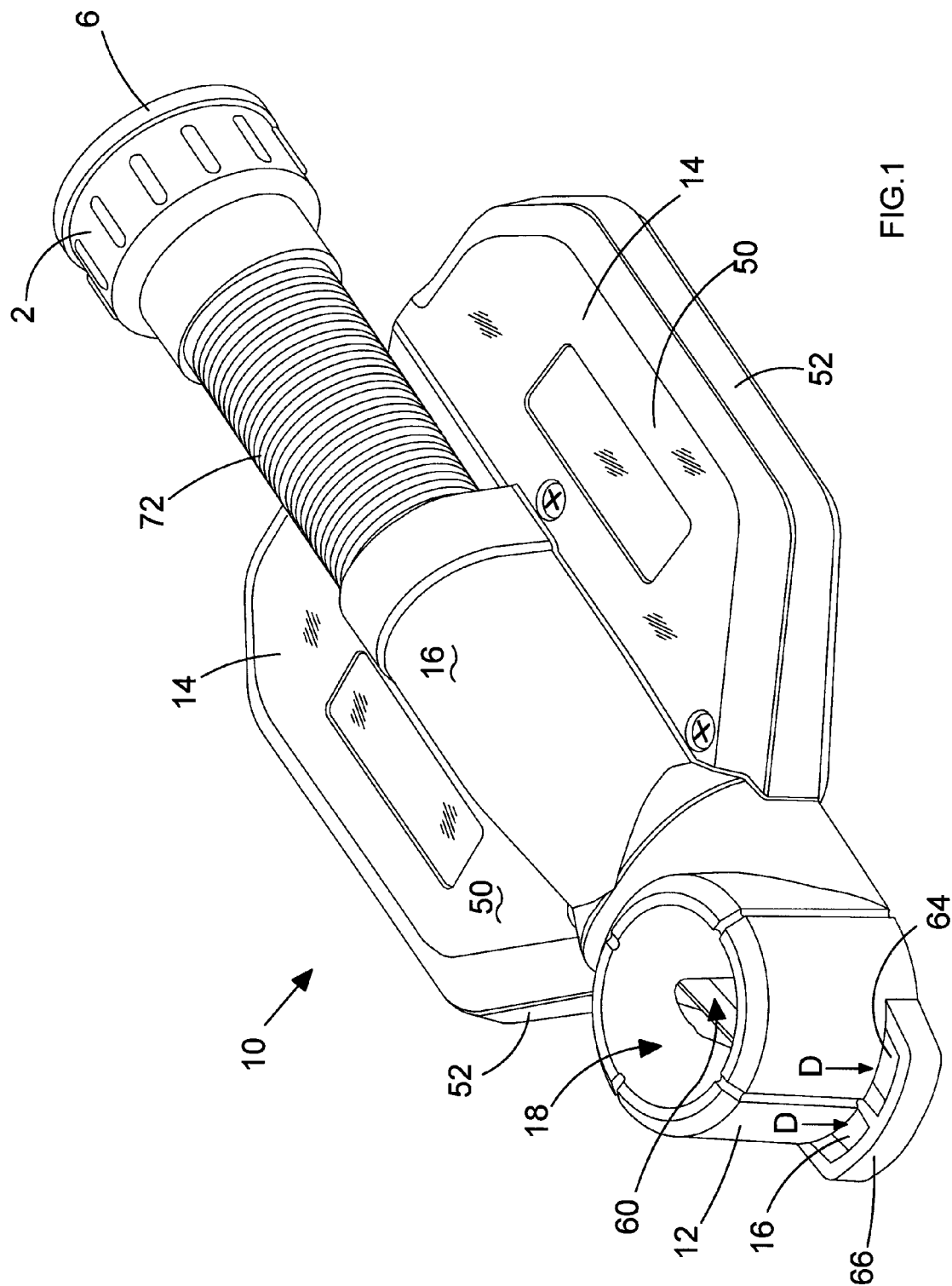
FIG. 1 shows a perspective view of the top of the suction cup dust extractor according to the first embodiment of the present invention.
Figure 2:
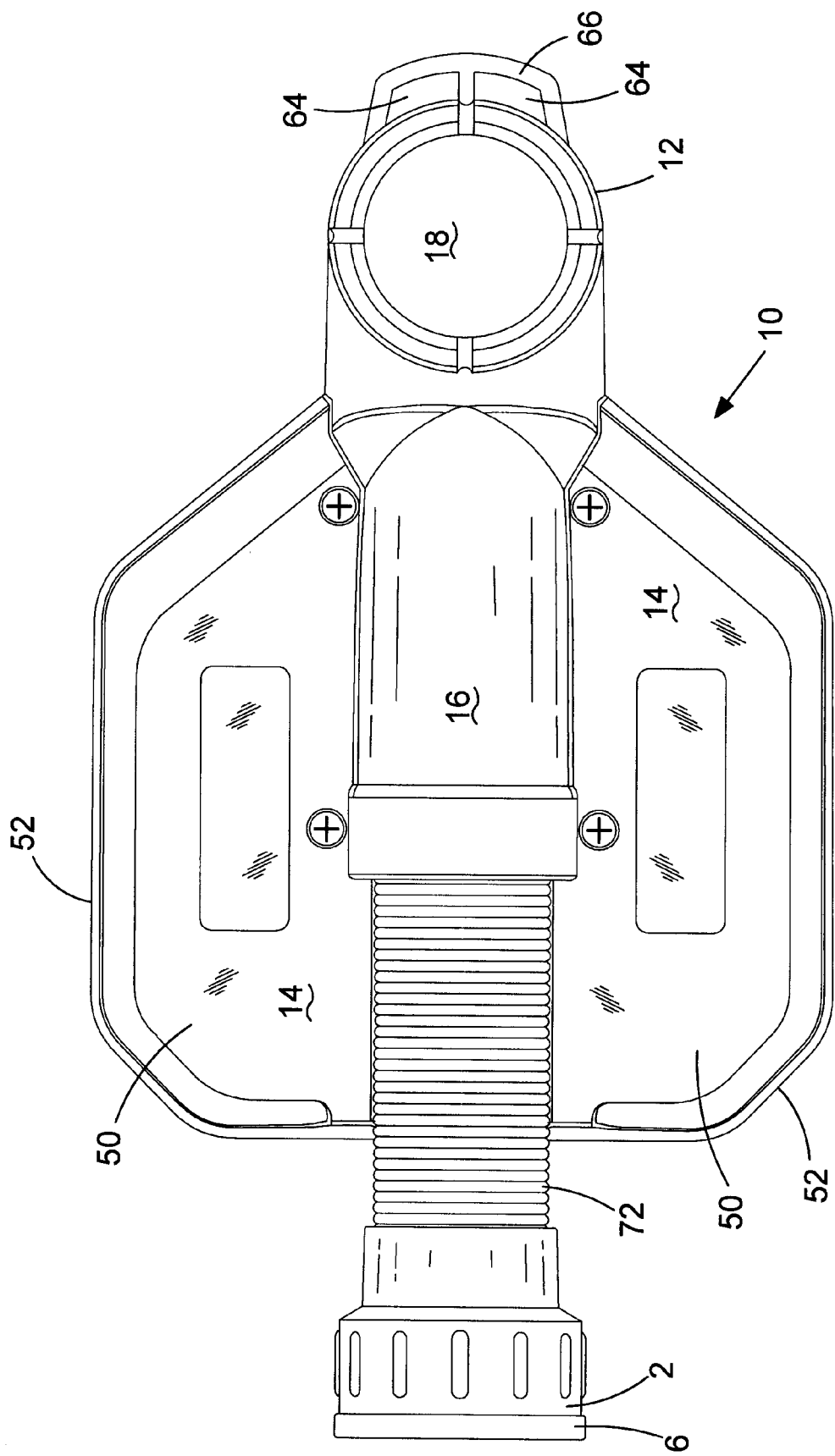
FIG. 2 shows a top view of the suction cup dust extractor.
Figure 3:
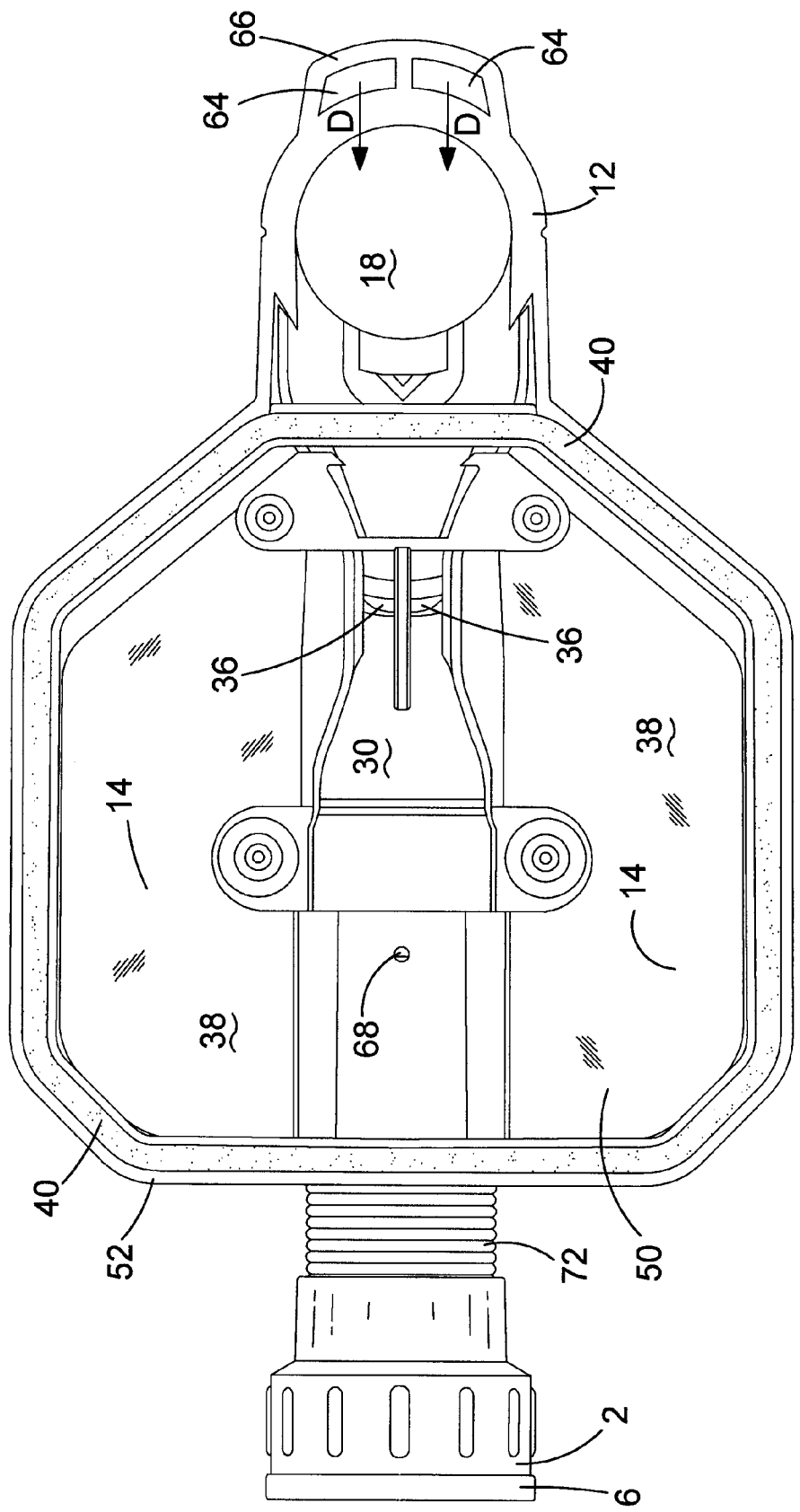
FIG. 3 shows a bottom view of the suction cup dust extractor.
Figure 4:
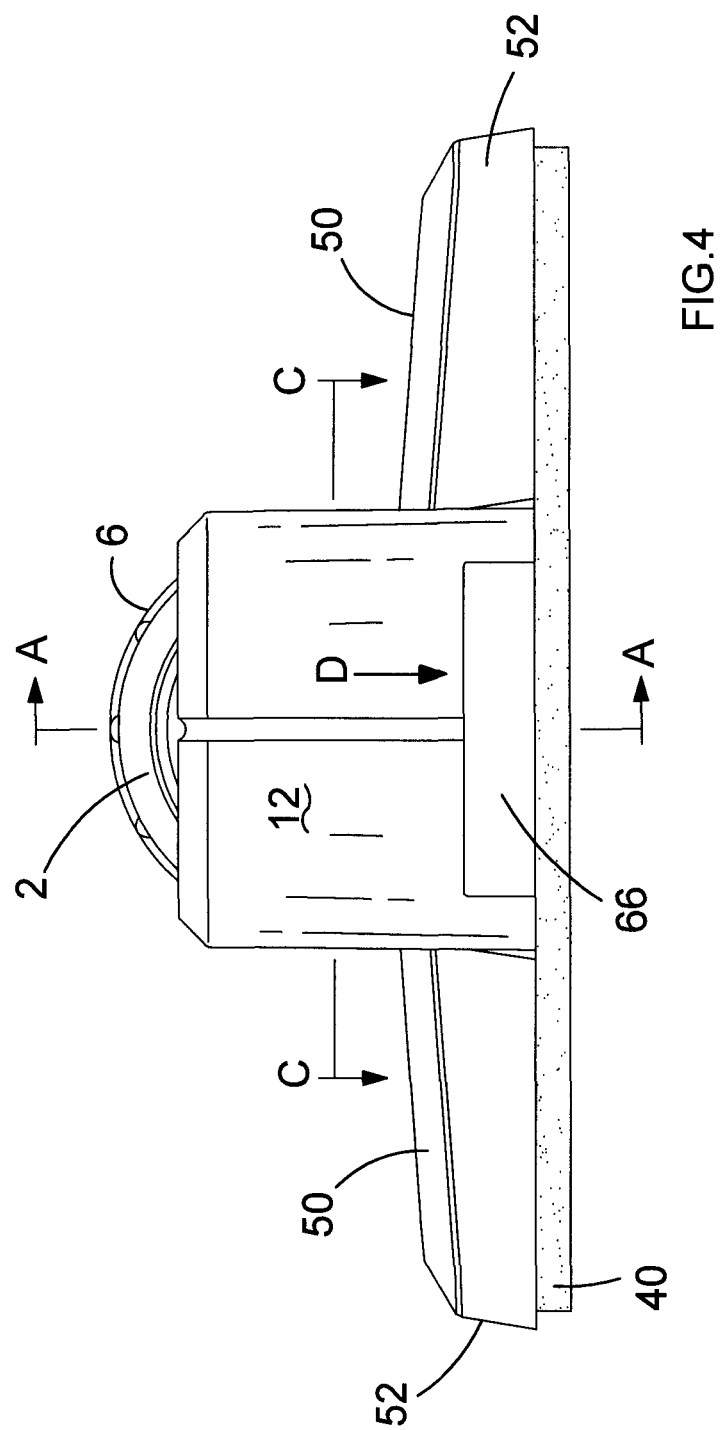
FIG. 4 shows a front view of the suction cup dust extractor.
Figure 5:
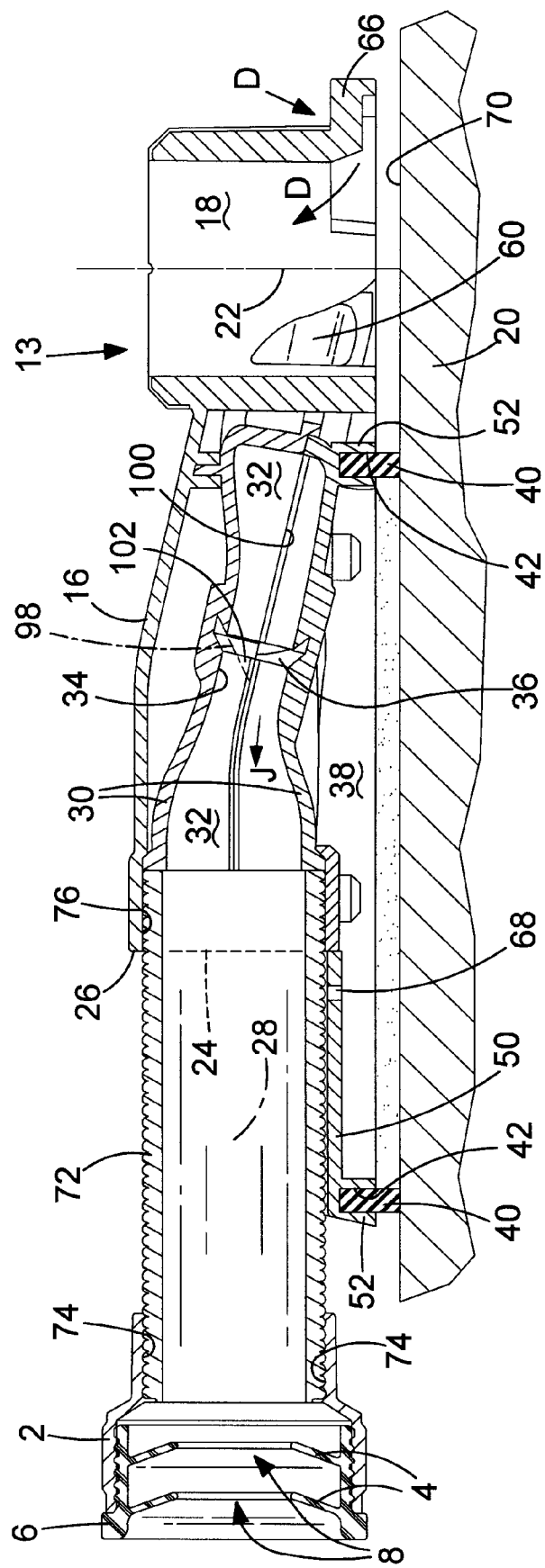
FIG. 5 shows a vertical cross sectional view of the suction cup dust extractor in the direction of Arrows A in FIG. 4.
Figure 6:
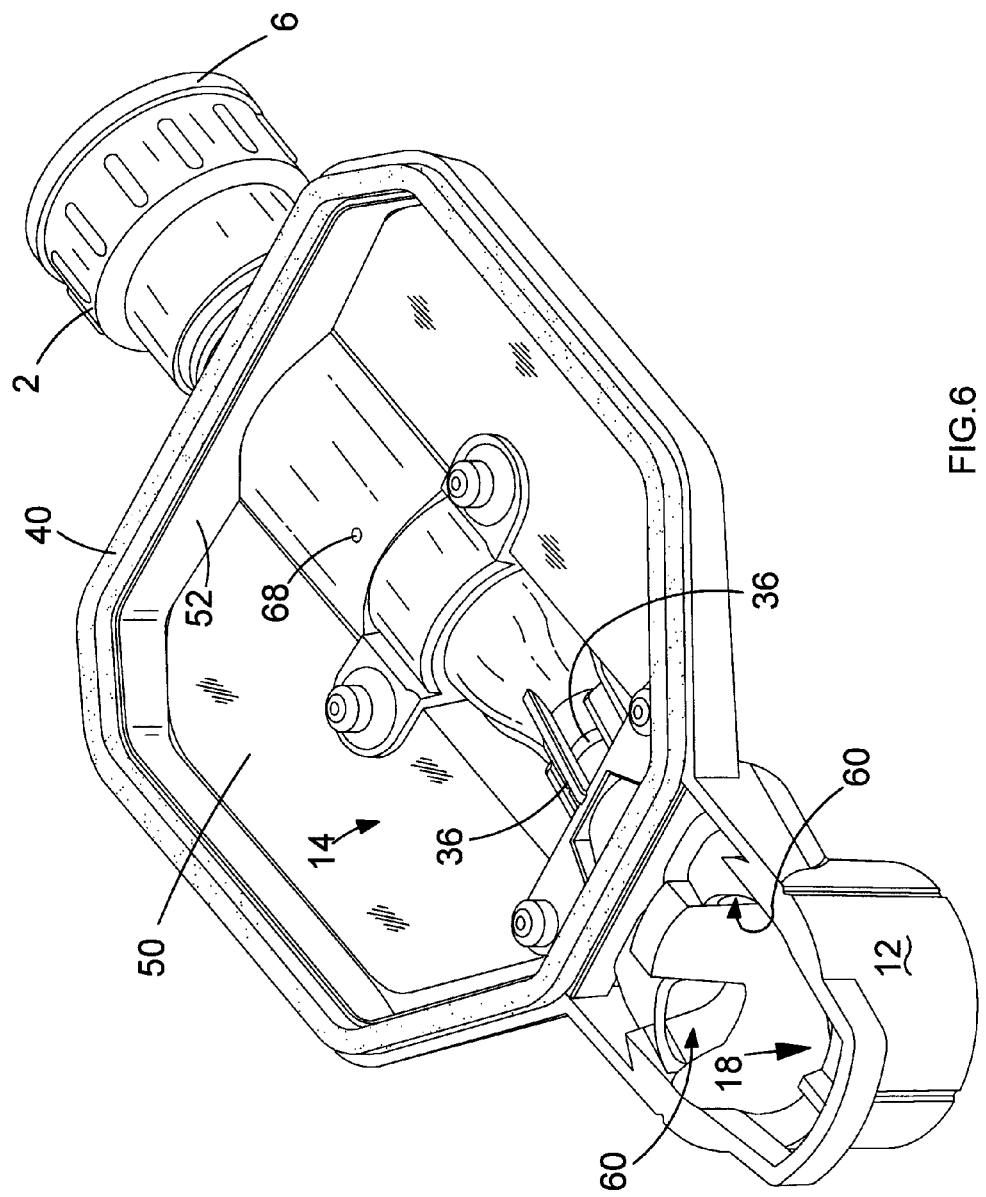
FIG. 6 shows a perspective view of the underside of the suction cup dust extractor.
Figure 7:
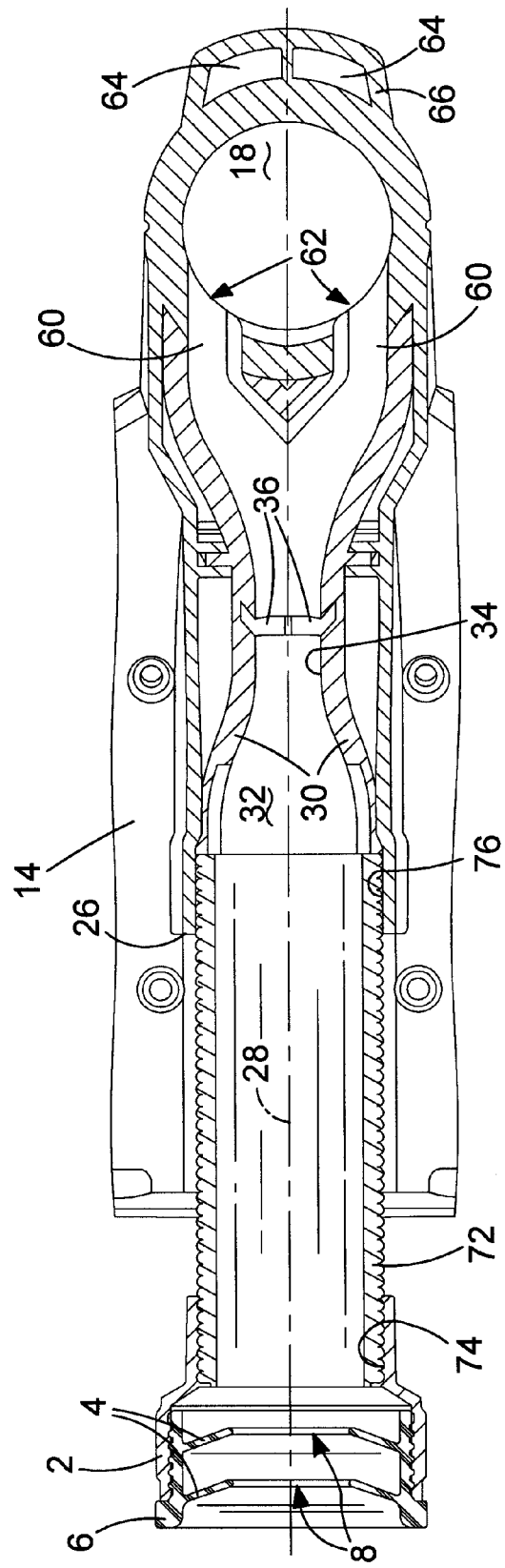
FIG. 7 shows a horizontal cross sectional view of the suction cup dust extractor in the direction of Arrows C in FIG. 4.
Figure 8:
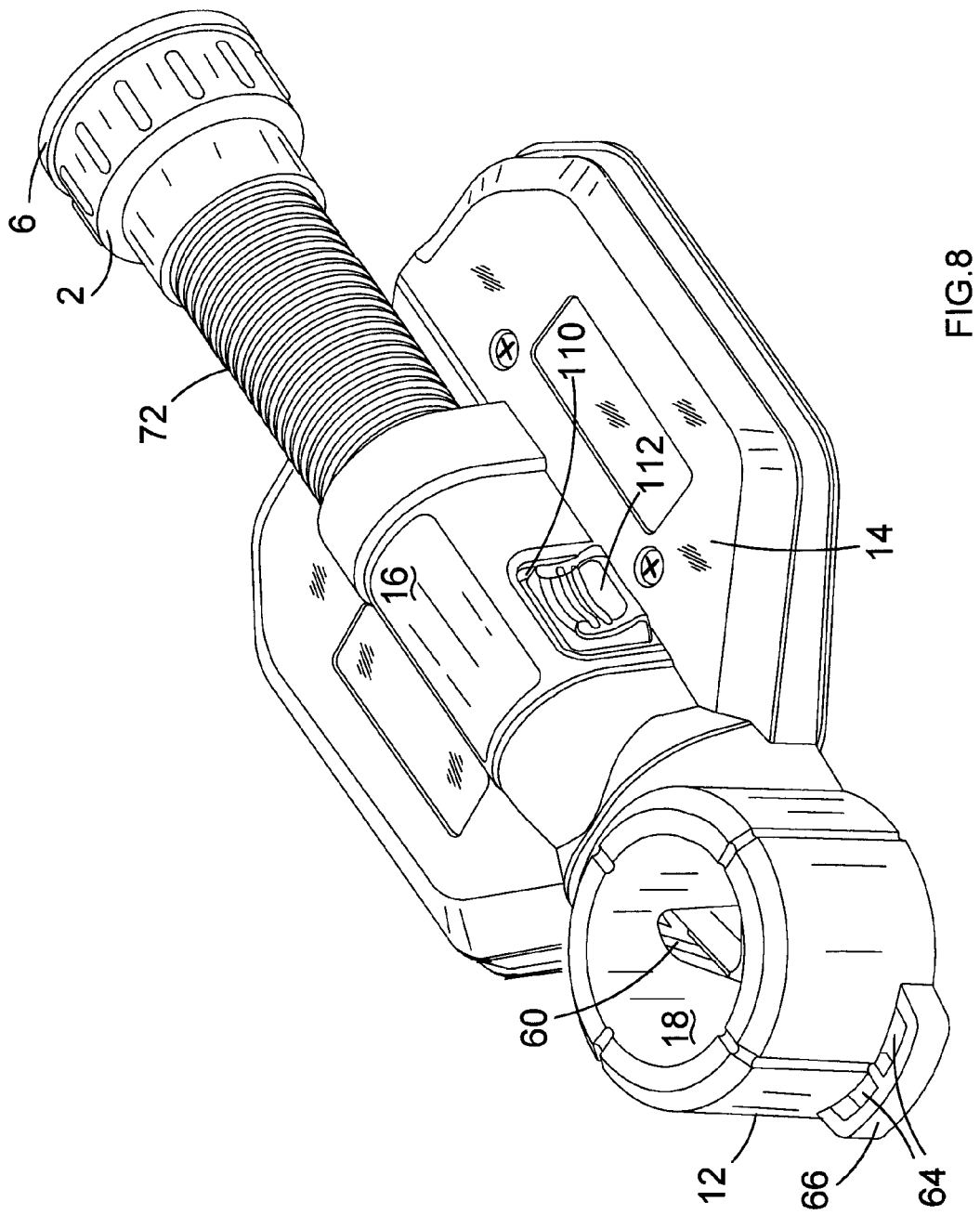
FIG. 8 shows a perspective view of the top of the suction cup dust extractor according to the second embodiment of the present invention.
Figure 9:
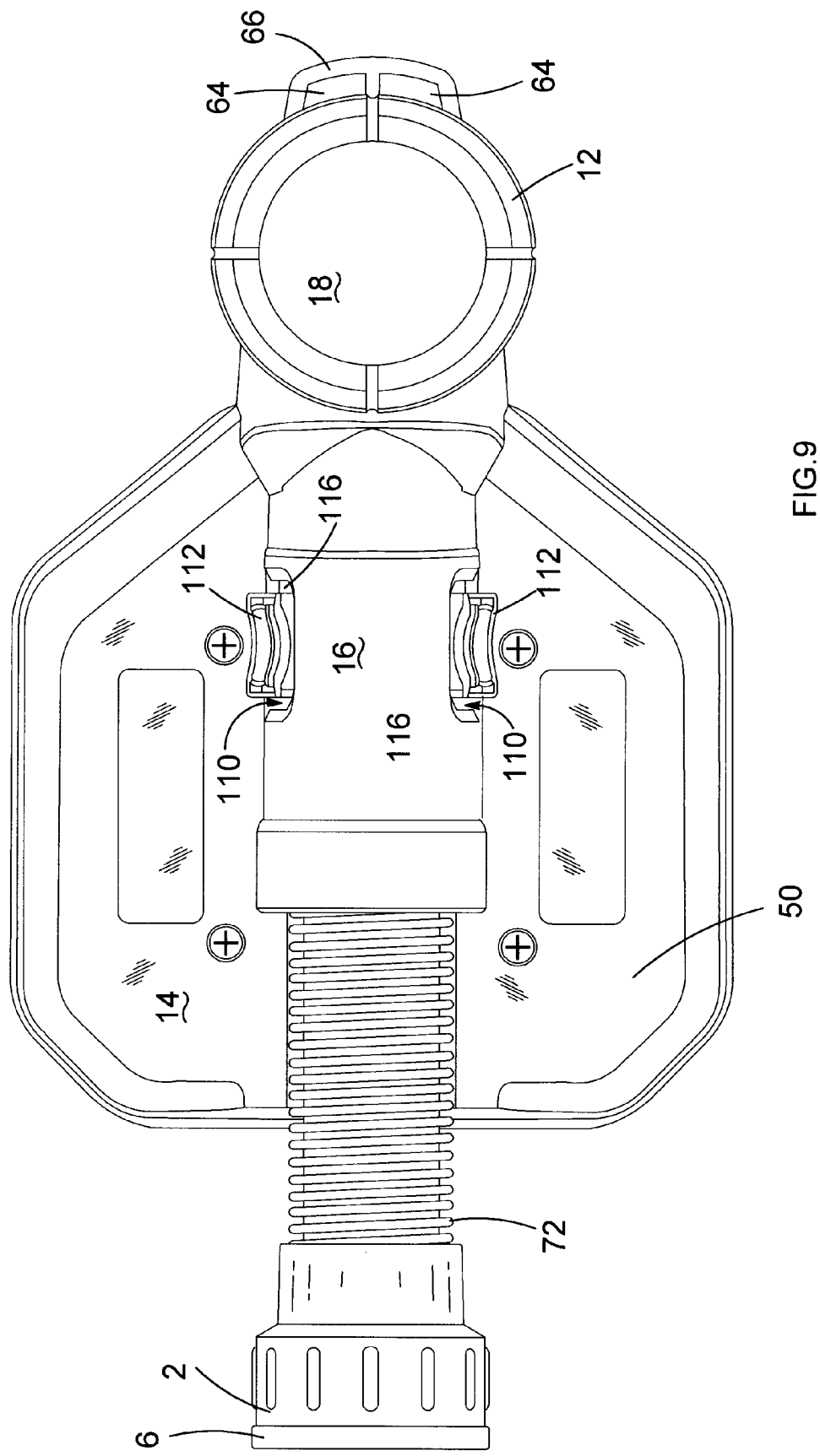
FIG. 9 shows a top view of the suction cup dust extractor.

Referring to FIGS. 1 to 7, the first embodiment of the suction cup dust extract will now be described.

The suction cup dust extractor comprises a housing 10 and a drill collar 12 rigidly connected to it at the top end of the housing 10. The housing 10 comprises a skirt 14 with a bridge 16 formed on top of the skirt 14. The bridge 16 extends from the middle of the skirt 16 to the top end of the skirt 16 where it is attached to the side of the drill collar 12. The bridge forms a hand grip by which an operator can hold the extractor using one hand, by placing the fingers of the hand on one side and the thumb on the other and squeezing the bridge to hold it. The skirt 14 has a top wall 50 and side walls 52 which define a large recess 38, on the opposite side of the skirt 14 to that on which the bridge 16 is attached, which has an opening which faces away from the bridge 16.

The drill collar 12 forms a drill passage 18 which enables a cutting tool, such as a drill bit (not shown), to pass through it (direction of Arrow B in FIG. 5) to engage a work piece 20. The drill collar 12 has a longitudinal axis 22. Both the drill passage 18 and the opening of the recess 38 are orientated in the same direction.

Formed in end 26 of the bridge 16 in the middle of the skirt 14 is an aperture 24 which provides an air exit. The aperture 24 has a longitudinal axis 28 which is perpendicular to and intersects with the longitudinal axis 22 of the drill collar 12.

Formed by an internal wall 30 of the housing 10 is a first passage 32 which extends from the aperture 24 towards the drill passage 18 of the drill collar 12. The internal wall 30 also forms one of the walls which form the recess 38. Formed within the first passage 32 is a throat 34 where the diameter of the passage 32 is reduced. Two apertures 36 are formed through the wall 30 of the passage 32 at the narrowest point of the throat 34. The apertures 36 provide two passageways directly from the passage 32, through the wall 30, to the recess 38 formed by the skirt 14. Such a construction provides the operator with easy access to the apertures 36 should they become blocked with debris as the apertures 36 are exposed to the recess which is easily accessible through the opening of the recess 38.

Each of the two apertures 36 has a longitudinal axis 98, which extends along the length of the passageway formed by the aperture 36, and which intersects with the longitudinal axis 100 of the passage 32, at the point where the apertures 36 and passage 32 meet, at an angle of between 40 and 50 degrees and ideally at 45 degrees (102). The longitudinal axes 98 extends into the passage 32 from the apertures 36, in a direction parallel to the longitudinal axis 100 of the passage 32, in the same direction as the flow of air as it is sucked from the drill passage 18 through the passage 32 (direction of Arrow J in FIG. 5).

The passage 32 splits into two passages 60 between the throat 34 and the drill passage 18, each connecting with the drill passage 18 through a separate aperture 62.

An inlet air passage 64 is formed in by a frame 66 attached to the base of the drill collar 12 and operates in the same manner as that described in EP1457288. Air can pass through the inlet air passage into the drill collar 12 as shown by Arrow D.

A seal 40 locates in a groove 42 formed around the periphery of the wall of the skirt 20 on the underside of the skirt 14. When the suction cup dust extractor is placed against a work piece 20, it engages with the seal 40, the work piece 20 sealing the opening to the recess 38 to form a chamber.

An air hole 68 is provided in the wall 50 of the skirt 20 to provide a small air passage between the recess and the surrounding atmosphere. During the use of the suction cup dust extractor, the hole 68 ensures that there is a limited but constant air flow in the recess formed under the skirt 20 if the seal provides a perfect air seal with the work piece 20.

The suction cup extractor further comprises a tubular connection collar 2 which connects to a vacuum source (not shown). A rubber seal 4 is fastened inside of the connection collar 2 and which comprises two rubber rings 4 which extend radially inwards from the drill collar 12 with an aperture 8 formed through them. The rings 4 are capable of gripping onto the nozzle (not shown) of a hose (not shown) of the vacuum source. As the rings 4 are resilient, they can stretch radially outwardly, increasing the size of the apertures 8, enabling nozzles of different sizes to be used. The rings 4 would then grip the nozzle due to their resilience and frictionally hold the nozzle.

The connection collar 2 connects to the aperture 24 via a flexible tube 72. One end of the flexible tube 72 is held in a sleeve 74 formed in the connection collar 2, the other in a sleeve 76 formed in the bridge 16. The flexible tube 72 can be stretched to extend its length and move the collar 2 away from the housing 10 or be bent or twisted to allow the connection collar 2 to be moved to a range of positions relative to the aperture 24. The flexible tube 72 is made from rubber.

In use, the suction cup dust extractor is placed against a surface 70 of the work piece 20 so that the seal 40 makes contact with it. A chamber is formed when opening of the recess 38, formed by the walls 30, 50, 52, of the skirt 14 is sealed by the surface 70 of the work piece 20. The suction device is activated and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the two apertures 36 due to a venturi effect. This results in the air in the recess 38 to be sucked out through the apertures 36 and into the passage 32. This causes the skirt 14 and hence the dust extractor, to be attached to the surface 70 due to the suction. The hole 68 ensures that there is a constant flow of air from the hole 68, through the recess 38, and then through the two apertures 36. The operator can then drill a hole in the surface by passing the drill bit through the drill collar 12 and drilling into the surface 70. Any debris generated during the drilling process will be sucked up into the drill passage 18 and then into passages 60. The use of two passages provides better debris clearance. The debris is then transported through the passage 32, through the aperture 24, through the flexible tube 72 and then through the connection collar 2. The hole 68 ensures that there is always air passing through the two aperture into the passage 32, thus ensuring no debris passes into the apertures 36 or the recess 38. Furthermore, the 45 degree angle between the apertures 36 and passage 32 further reduces the risks of any debris entering the apertures 36 as it sucked past the apertures 36 from the drill passage 18 to the aperture 24.

A second embodiment of the present invention will now be described with reference to FIGS. 8 to 14. Where the same features are present in the second embodiment which are present in the first embodiment, the same reference numbers have been used. The design of the second embodiment is the same as that for the first embodiment except for the design of three features, namely, 1) the design of the seal 40 has been altered, 2) the provision of an additional aperture to the two apertures 36, and 3) a new feature of a pressure release mechanism for the recess 38 has been added.

Firstly, the changes to the design of the seal will be described.

Figure 10:
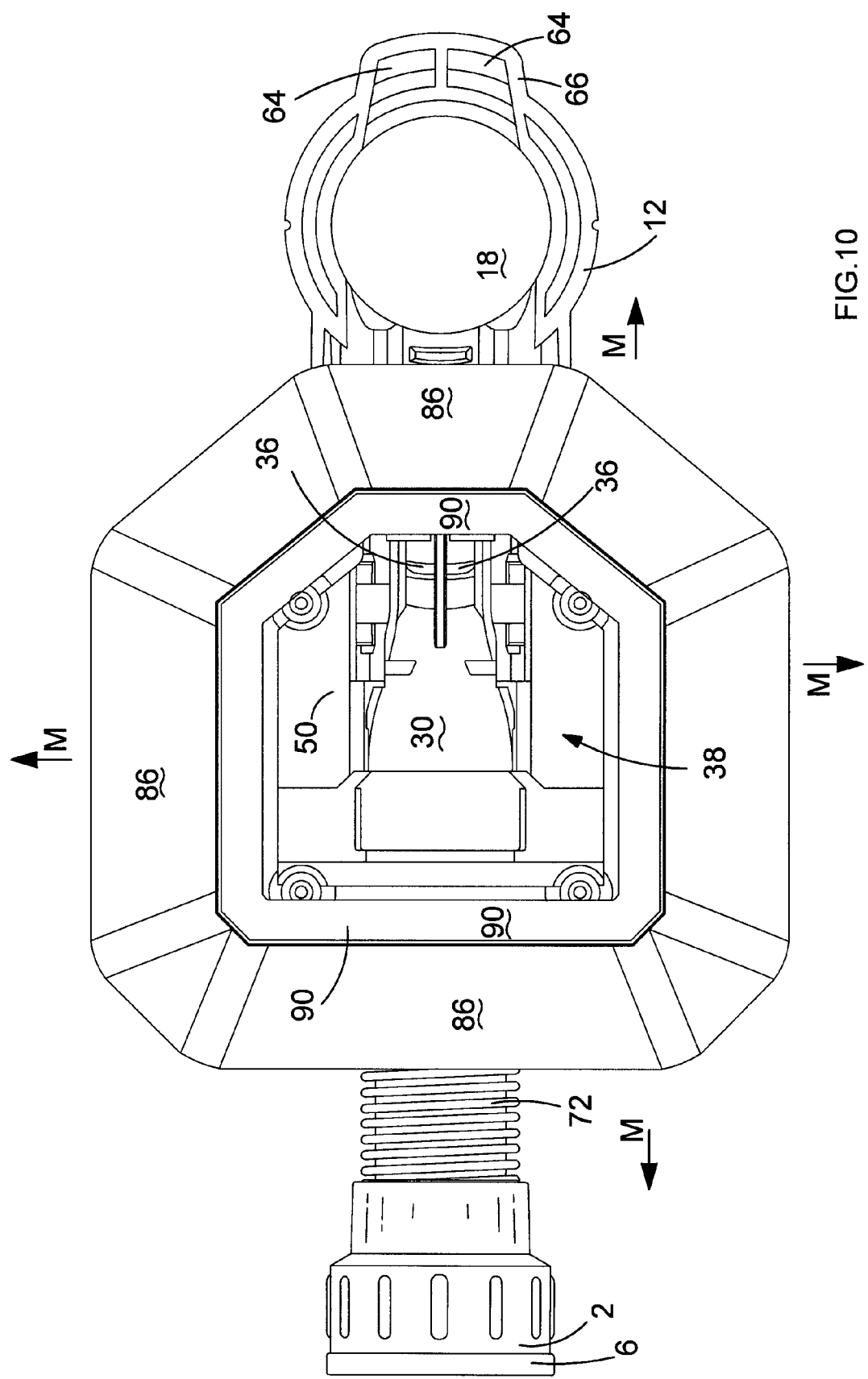
FIG. 10 shows a bottom view of the suction cup dust extractor.
Figure 11:
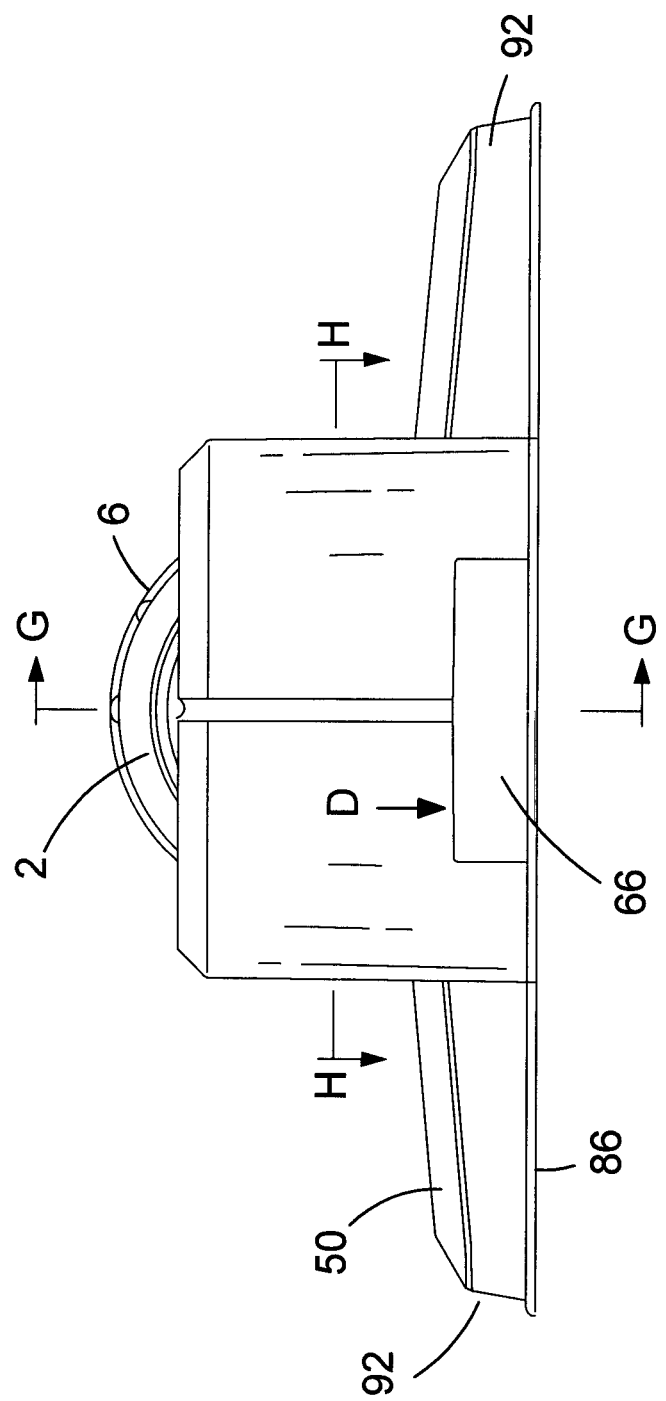
FIG. 11 shows a front view of the suction cup dust extractor.
Figure 12:
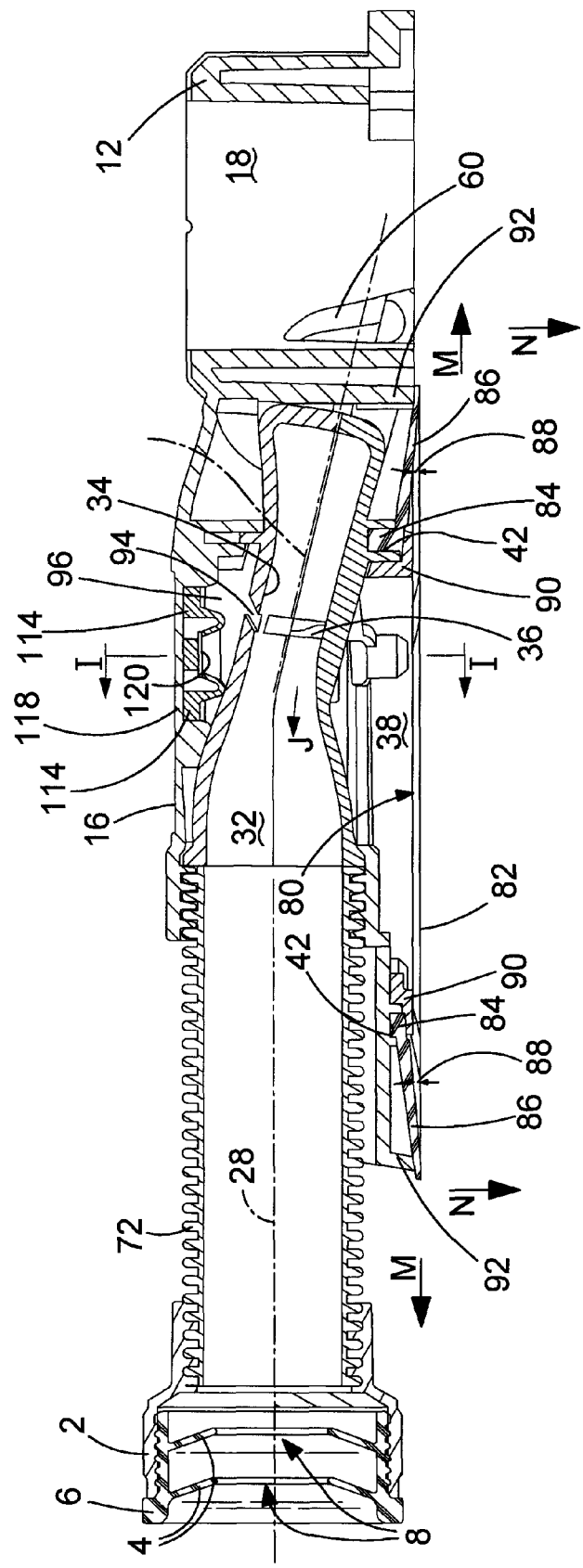
FIG. 12 shows a vertical cross sectional view of the suction cup dust extractor in the direction of Arrows G in FIG. 11.
Figure 14:
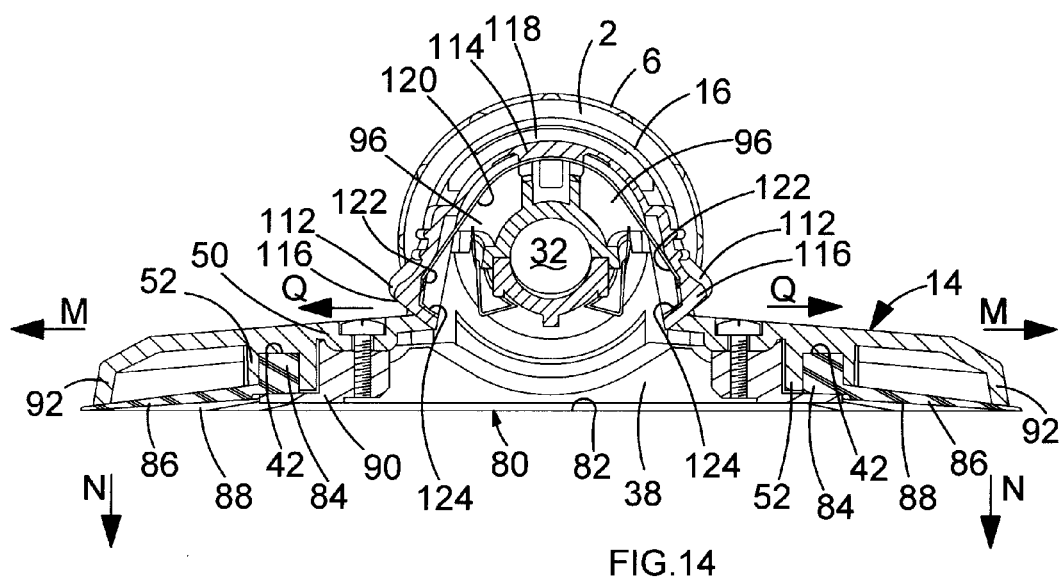
FIG. 14 shows a vertical cross sectional view of the suction cup dust extractor in the direction of Arrows I in FIG. 12.

Referring to FIGS. 10, 12, and 14, the opening 80 of the recess 38 is planar ie the periphery of the opening 80 locates in a flat plane 82. The seal comprises a base 84 which locates in a groove 42 formed in the wall 52 of the skirt 14. The base 84 of the seal is held within the grove 42 via cover 90 which is held in place on the housing using screws (not shown). A flange 86 is attached to the base 84 which extends from the base 84 in a direction which is an oblique or small angle 88 relative to the plane 82. The flange 86 extends, in a direction parallel to the plane 82 (in the direction of Arrows M), away from the opening 80. The flange 86 extends, in a direction perpendicular to the plane 82 (in the directions of Arrows N), away from the opening 80. The outer perimeter of the flange 86 is supported by a secondary wall 92 formed on the shirt 14 of the housing 10.

Secondly, the additional aperture 94 and its inter connection with the recess will now be described.

Figure 13:
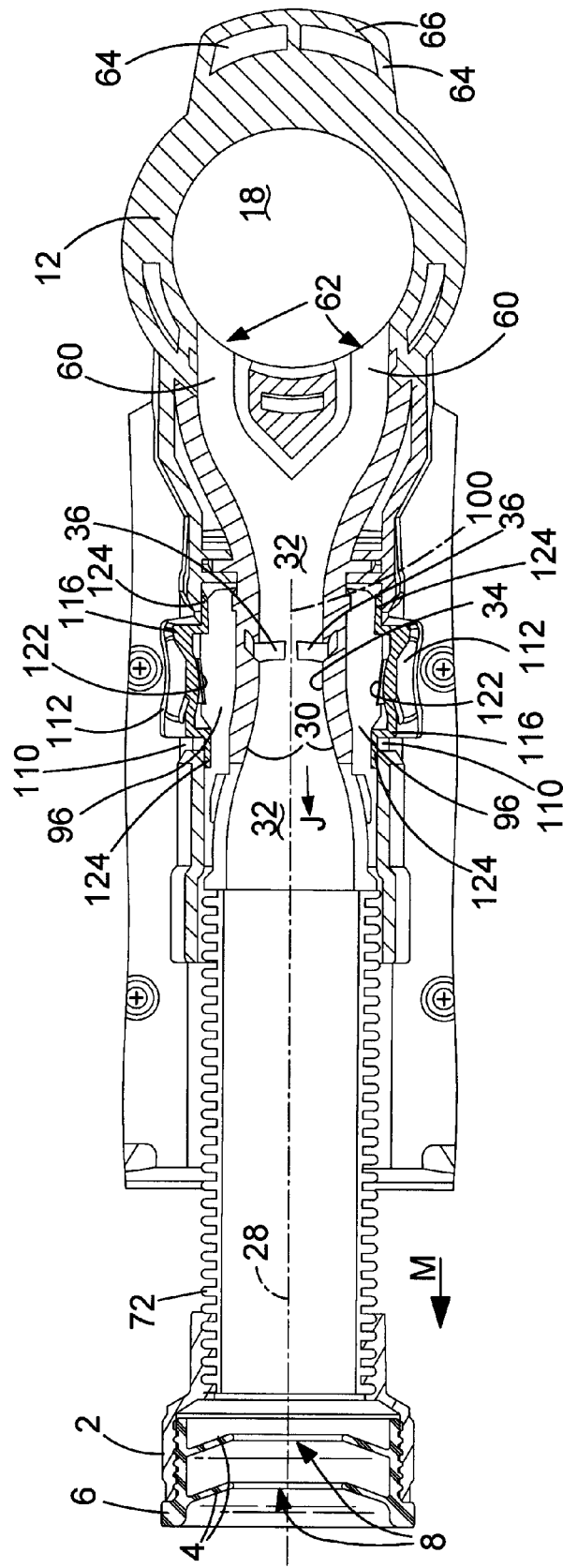
FIG. 13 shows a horizontal cross sectional view of the suction cup dust extractor in the direction of Arrows H in FIG. 11.
Figure 15:
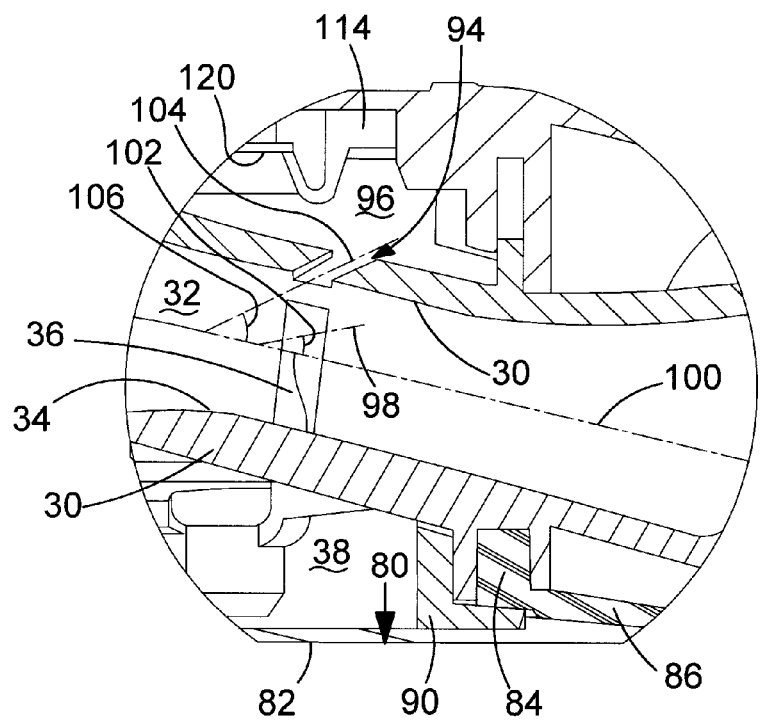
FIG. 15 shows a close up view of the venture passages.

Referring to FIGS. 12, 13 and 15, in addition to the two apertures 36 formed through the wall of the passage 32 at the narrowest point of the throat 34 to provide two direct passageways from the passage 32 to the recess 38, there is provided a third aperture 94, located between the two apertures 36, which is formed through the wall of passage 32 at the narrowest point 34 and which connects to an intermediary chamber 96 formed in the bridge 16. The intermediary chamber 96 connects to the recess 38 so that air can freely move between the intermediary chamber 96 and the recess 38. The outer wall of the intermediary chamber is formed by the external wall of the bridge 16.

Each of the two apertures 36 has a longitudinal axis 98, which extends along the length of the passageway formed by the aperture 36, and which intersects with the longitudinal axis 100 of the passage 32, at the point where the apertures 36 and passage 32 meet, at an angle of between 40 and 50 degrees and ideally at 45 degrees (102). The longitudinal axes 98 extend into the passage 32 from the apertures 36, in a direction parallel to the longitudinal axis 100 of the passage 32, in the same direction as the flow of air as it is sucked from the drill passage through the passage 32 (direction of Arrow J in FIGS. 12 and 15).

The third aperture 94 has a longitudinal axis 104, which extends along the length of the passageway formed by the aperture 94, and which intersects with the longitudinal axis 100 of the passage 32, at the point where the third aperture 94 and passage 32 meet, at an angle of between 40 and 50 degrees and ideally at 45 degrees 106. The longitudinal axis 104 extends into the passage 32 from the aperture 94 in a direction parallel to the longitudinal axis 100 of the passage 32, in the same direction as the flow of air as it is sucked from the drill passage through the passage 32 (direction of Arrow J in FIGS. 12 and 15.

The 45 degree angle between the apertures 36 and passage 32 reduces the risks of any debris entering the apertures 36 or third aperture as it sucked past the apertures 36, 94 from the drill passage 18 to the aperture 24.

The addition of the third aperture provides for increased suction in the recess 38.

Thirdly, the new feature of a pressure release mechanism for the recess 38 will now be described.

Formed in each side of the bridge 16 is a button aperture 110. Located within each button aperture 110 is a button 112. Each button 112 is mounted on an end 116 of a flexible plastic support 114 which extends around the inside of the outer wall 118 of the bridge 16 inside of the intermediary chamber 96, wrapping around the top half of the passage 32 (see FIG. 14). A leaf spring 120, which extends along the length of the plastic support 114, is surrounded by the plastic support 114, and also wraps around the top half of the passage 32. The ends 122 of the leaf spring 120 directly engage behind the ends 116 of the plastic support behind the buttons 112. The leaf spring 120 is resilient in nature and, if left in isolation would straighten up along its length. When located as shown in FIG. 14, the leaf spring 120 has been bent against its biasing force in order to be able to fit in the position as shown. The ends of the leaf spring 120 urge the ends 116 of the plastic support outwardly (in the direction of Arrow Q), urging the buttons 112 through the apertures 110.

The edges of the ends 116 of the plastic support 114 engage with the edges 124 of the walls of the bridge 16 and skirt 14 housing 10, due to the biasing force of the spring 120, to seal the apertures 110, thus preventing any air from escaping from the intermediary chamber 96 through the apertures 110.

In use, the suction cup dust extractor is placed against a surface 70 of the work piece 20 so that the seal 40 makes contact with it. A chamber is formed when opening of the recess 38, formed by the walls 30, 50, 52, of the skirt 14 is sealed by the surface 70 of the work piece 20. The suction device is activated and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the three apertures 36, 94 due to a venturi effect. This results in the air in the recess 38 to be sucked out either directly through the two apertures 36 or through the intermediary chamber 96 and the third aperture 94 and into the passage 32. This causes the skirt 14 and hence the dust extractor, to be attached to the surface 70 due to the suction. During the normal operation, the buttons 112 are in their outer most position due to the biasing force of the leaf spring 120, the edges of the ends of the plastic support engaging with the edges 124 of the of the walls of the bridge and skirt 14. In order to release the suction cup extractor from the wall, the operator has two options. Firstly, the operation can switch of the vacuum device, reducing the pressure in the recess. Alternatively, the operator can depress the bottons 112, moving the buttons 112 and the ends 116 of the plastic support 114, against the biasing force of the leaf spring 120, into the intermediary chamber 96, breaking the seal formed between the edges of the ends 116 of the plastic support 114 and the edges 124 of the of the walls of the bridge 16 and skirt 14, allowing air to be sucked in to the intermediary chamber from the air surrounding the extractor. This increases the pressure in the intermediary chamber 96 which, in turn, increases the pressure in the recess 38. As such, the amount of suction created within the recess is reduced, allowing the operator to remove the extractor from the wall.

The use of two button constructed in this manner allows the operator to pinch the buttons 112 together to release the extractor whilst holding the bridge 16 in one hand by squeezing the bridge 16 between his fingers and thumb.

It will be appreciated by the reader that, as an alternative, the buttons 112 themselves can form a seal with the edges of the walls of the bridge 16 and skirt 14 instead of the ends 116 of the plastic support 114.

The invention claimed is:

1. A suction cup dust extractor for a drill comprising:
   a housing;
   a drill collar attached to the housing, having a drill passage formed through it;
   an aperture located on the housing through which air can be sucked out by a suction device;
   a recess formed by walls of the housing having an opening which, in use, locates against a work piece to create a chamber;
   at least one first air passage formed within the housing which enables air to pass from the drill passage to the aperture;
   at least one second air passage formed within the housing which enables air to pass from the recess to the aperture; and
   a manually operable valve mechanism mounted in the housing which is connected to the recess and which, when operated, allows air surrounding the housing to freely enter the recess when the opening is located against a work piece;
   characterized in that the housing further comprises a hand grip, the valve mechanism being mounted, at least in part, inside of the hand grip, wherein the valve mechanism comprises two moveable buttons, one of which is mounted on one side of the hand grip, the other being mounted on the other and opposite side of the hand grip, each button being moveable between a first position where it operates the valve mechanism and a second position where it does not operate the valve mechanism, each button being biased to its second position.

2. The suction cup dust extractor of claim 1, wherein each button is mounted on an end of a curved resiliently deformable frame mounted inside the hand grip.

3. The suction cup dust extractor of claim 2, wherein the deformable frame comprises a plastic support and a leaf spring.

4. The suction cup dust extractor of claim 3, wherein the leaf spring biases the buttons to their second positions.

5. The suction cup dust extractor of claim 1, further including an intermediary chamber in the hand grip which is connected to the recess so that air can freely move between the two; and
   wherein, when each button is in its first position, it locates inside of the intermediate chamber and when each button is in its second position, it locates with an aperture formed in the wall of the chamber.

6. The suction cup dust extractor of claim 5, wherein when the buttons are in their second positions, ends of the deformable frame or the buttons engage with edges of the aperture to form an air tight seal.

7. The suction cup dust extractor of claim 1, wherein the buttons are located on the hand grip so that movement of either button from its second position to its first position moves it towards the other button.

8. The suction cup dust extractor of claim 1, wherein the at least one first air passage is at least partially located in the hand grip.

9. The suction cup dust extractor of claim 1, wherein the aperture is located on the hand grip.

10. The suction cup dust extractor of claim 1, further including a hole in the walls of the recess to allow a limited flow of air into the recess.

11. The suction cup dust extractor of claim 1, wherein the at least one first passage connects between the aperture and the drill passage.

12. The suction cup dust extractor of claim 1, wherein the at least one second passage intersects with the at least one first passage inside of the housing.

13. The suction cup dust extractor of claim 1, wherein the at least one first passage comprises a throat, the at least one second passage intersecting with the at least one first passage at the throat.

14. The suction cup dust extractor of claim 1, further including a connection collar which is connected to the aperture via a flexible tube.

\* \* \* \* \*